United States Patent
Lu (10) Patent No.: US 12,236,055 B2
(45) Date of Patent: Feb. 25, 2025

(54) TOUCH DISPLAY PANEL AND TOUCH DISPLAY DEVICE

(71) Applicant: TCL CHINA STAR OPTOELECTRONICS TECHNOLOGY CO., LTD., Guangdong (CN)

(72) Inventor: Zhitao Lu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,825

(22) PCT Filed: Apr. 13, 2022

(86) PCT No.: PCT/CN2022/086617
§ 371 (c)(1),
(2) Date: May 9, 2022

(87) PCT Pub. No.: WO2023/184580
PCT Pub. Date: Oct. 5, 2023

(65) Prior Publication Data
US 2024/0152241 A1    May 9, 2024

(30) Foreign Application Priority Data
Apr. 1, 2022    (CN) .......................... 202210347327.0

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0443* (2019.05); *G06F 3/0446* (2019.05)

(58) Field of Classification Search
CPC .... G06F 3/0448; G06F 3/0412; G06F 3/0443; G06F 3/0446
See application file for complete search history.

(56) References Cited

U.S. PATENT DOCUMENTS

| 11,579,728 B2 * | 2/2023 | Kim ................ G06F 3/04184 |
| 2015/0277655 A1 * | 10/2015 | Kim .................. G06F 3/0412 345/174 |

(Continued)

FOREIGN PATENT DOCUMENTS

| CN | 103472961 A | 12/2013 |
| CN | 104951126 A | 9/2015 |

(Continued)

OTHER PUBLICATIONS

International Search Report in International application No. PCT/CN2022/086617, mailed on Nov. 29, 2022.

(Continued)

*Primary Examiner* — Amy Onyekaba
(74) *Attorney, Agent, or Firm* — PV IP PC; Wei Te Chung (57) ABSTRACT

An embodiment of the present invention provides a touch display panel and a touch display device including an underlay substrate and touch electrodes. The touch electrodes include a plurality of pattern electrodes. Adjacent ones of the pattern electrodes along are arranged in a staggered arrangement a first direction. The pattern electrode has a first width along the first direction and has a second width along a second direction. The second width is greater than the first width. Changing an arrangement of the pattern electrodes reduces touch lead lines in the display panel, improves a touch precision of the display panel, and lowers a manufacturing cost.

20 Claims, 7 Drawing Sheets

(56) References Cited

U.S. PATENT DOCUMENTS

| | | | |
|---|---|---|---|
| 2016/0041654 A1* | 2/2016 | Bulea | G06F 3/041 345/174 |
| 2016/0183382 A1* | 6/2016 | Solven | G06F 3/0445 29/830 |
| 2016/0357334 A1 | 12/2016 | Ding et al. | |
| 2017/0168609 A1* | 6/2017 | Chang | G06F 3/0448 |
| 2017/0228068 A1* | 8/2017 | Pu | G06F 3/04164 |
| 2021/0096724 A1* | 4/2021 | Liu | G06F 3/04164 |
| 2022/0083170 A1* | 3/2022 | Liu | G06F 3/0412 |
| 2022/0197474 A1* | 6/2022 | Kang | G06F 3/0412 |
| 2022/0276745 A1* | 9/2022 | Kim | G06F 3/04186 |

FOREIGN PATENT DOCUMENTS

| | | |
|---|---|---|
| CN | 107256104 A | 10/2017 |
| CN | 109656063 A | 4/2019 |
| CN | 110034168 A | 7/2019 |
| CN | 110189639 A | 8/2019 |
| CN | 110703945 A | 1/2020 |

OTHER PUBLICATIONS

Written Opinion of the International Search Authority in International application No. PCT/CN2022/086617, mailed on Nov. 29, 2022.

Chinese Office Action issued in corresponding Chinese Patent Application No. 202210347327.0 dated May 14, 2024, pp. 1-7.

* cited by examiner

FIG. 1

Prior Art

TOUCH DISPLAY PANEL AND TOUCH DISPLAY DEVICE

FIELD OF INVENTION

The present invention relates to fields of design and manufacturing of display panels, especially to a touch display panel and a touch display device.

BACKGROUND OF INVENTION

With development of manufacturing processes of display panels, people have higher demands for performance and quality of display panels and devices.

A touch display panel is capable of performing a touch operation on screen and is therefore applied in various display fields. For a touch display panel, projected capacitive touch screens are mainly applied to the market, and the capacitive touch screens are mainly classified in self-capacitive and mutual capacitive touch screens. In general, a capacitor touch display panel has electrode axes arranged in transverse and longitudinal directions, and each electrode axis has electrodes electrically connected and arranged along the same axis. When a touch operation is performed to a display panel, a plurality of corresponding touch points are on the touch screen, each of the touch points corresponds to a transverse coordinate and a longitudinal coordinate. A conventional touch display panel, when recognizing the touch points formed as above, a corresponding coordinate value would have certain confusion to form a ghost points phenomenon. Also, in a large size display panel, because a number of corresponding touch sensing units is large, a number of read-out lead lines corresponding to the touch sensing units are also large. Therefore, when the touch points are read for recognition, a greater signal-noise ratio occurs to further lower a touch sensitivity and a touch effect of the touch display panel, which disadvantages improvement of a comprehensive performance of the touch display panel.

Therefore, it is required to set forth a solution for the issue of the conventional technology.

SUMMARY OF INVENTION

Technical Issue

As described, the touch display panel manufactured by a conventional technology, when a touch operation is performed to the touch display panel, cannot recognize touch points well, which affects touch precision and touch sensitivity of the display panel and disadvantages improvement of a comprehensive performance of the touch display panel.

Technical Solution

To solve the above issue, the embodiment of the present invention provides a touch display panel a touch display device to effectively mitigate an issue of unqualified touch display panel touch precision angle and a touch effect and effectively improve a comprehensive performance of the touch display panel.

To solve the above issue, technical solutions provided by the embodiment of the present invention are as follows:

A first aspect of the embodiment of the present invention provides a touch display panel, including:
an underlay substrate; and
touch electrodes including a plurality of pattern electrodes, wherein the pattern electrodes are disposed in an array along a first direction and a second direction intersecting the first direction;
wherein adjacent ones of the pattern electrodes are arranged in a staggered arrangement along the first direction, each of the pattern electrodes in the pattern electrodes has a first width along the first direction and has a second width along the second direction, the second width is greater than the first width, an included angle is defined between the first direction and the second direction, and the included angle is a right angle.

According to an embodiment, a ratio of the second width of the pattern electrode along the second direction to the first width of the pattern electrode along the first direction is N:1, and the N is an integer greater than 1.

According to an embodiment, the second width of the pattern electrodes along the second direction is twice the first width of the pattern electrodes along the first direction.

According to an embodiment, the pattern electrodes includes a plurality of first pattern electrodes and a plurality of second pattern electrodes, the first pattern electrodes and the second pattern electrodes are disposed alternately along the first direction, wherein along the first direction, at least an end portion of one of the first pattern electrodes is flush with a central line of one of corresponding ones of the second pattern electrodes.

According to an embodiment, along the first direction, the first pattern electrodes and the second pattern electrodes are disposed alternately at equal intervals.

A second aspect of the embodiment of the present invention provides a touch display panel, including:
an underlay substrate; and
touch electrodes including a plurality of pattern electrodes, wherein the pattern electrodes are disposed in an array along a first direction and a second direction intersecting the first direction;
wherein adjacent ones of the pattern electrodes are arranged in a staggered arrangement along the first direction, each of the pattern electrodes in the pattern electrodes has a first width along the first direction and has a second width along the second direction, and the second width is greater than the first width.

According to an embodiment of the present invention, a ratio of the second width of the pattern electrode along the second direction to the first width of the pattern electrode along the first direction is N:1, and the N is an integer greater than 1.

According to an embodiment of the present invention, the second width of the pattern electrodes along the second direction is twice the first width of the pattern electrodes along the first direction.

According to an embodiment of the present invention, the pattern electrodes includes a plurality of first pattern electrodes and a plurality of second pattern electrodes, the first pattern electrodes and the second pattern electrodes are disposed alternately along the first direction, wherein along the first direction, at least an end portion of one of the first pattern electrodes is flush with a central line of one of corresponding ones of the second pattern electrodes.

According to an embodiment of the present invention, along the first direction, the first pattern electrodes and the second pattern electrodes are disposed alternately at equal intervals.

According to an embodiment of the present invention, along the second direction, an interval between adjacent two of the first pattern electrodes is the same as an interval between adjacent two of the second pattern electrodes.

According to an embodiment of the present invention, the first width of each of the first pattern electrodes along the first direction is the same as the first width of each of the second pattern electrodes along the first direction.

According to an embodiment of the present invention, a second width of the first pattern electrode along the second direction is greater than a first width of the first pattern electrode along the first direction, and a second width of the second pattern electrode along the second direction is greater than a first width of the second pattern electrode along the first direction.

According to an embodiment of the present invention, the touch display panel further includes touch lead lines, and the touch lead lines are connected correspondingly to the pattern electrodes.

According to an embodiment of the present invention, the touch display panel further includes connection terminals, the connection terminals are disposed on the pattern electrodes, the touch lead lines are electrically connected to the pattern electrodes through the connection terminals.

According to an embodiment of the present invention, along the first direction, the connection terminals disposed on the pattern electrodes at intervals are located in a same straight line.

According to an embodiment of the present invention, intervals among adjacent ones of the touch lead lines are the same.

According to an embodiment of the present invention, the pattern electrodes include a plurality of third pattern electrodes and a plurality of fourth pattern electrodes, the third pattern electrodes and the fourth pattern electrodes are arranged in an array along the first direction and the second direction, the third pattern electrodes and the fourth pattern electrodes along the first direction are disposed alternately, and the second width of one of the third pattern electrodes along the second direction is greater than the second width of one of the fourth pattern electrodes along the second direction.

According to an embodiment of the present invention, a length of the third pattern electrodes along the second direction is greater than a length of the fourth pattern electrodes along the second direction.

According to a third aspect of the present invention, a touch display device is also provided and includes:
 a display panel; and,
 a touch display panel, wherein the touch display panel is disposed opposite to the display panel, the touch display panel includes a touch region, and a plurality of touch electrodes are disposed in the touch region;
 wherein the touch display panel includes:
 an underlay substrate; and
 touch electrodes including a plurality of pattern electrodes, wherein the pattern electrodes are disposed in an array along a first direction and a second direction intersecting the first direction;
 wherein adjacent ones of the pattern electrodes are arranged in a staggered arrangement along the first direction, each of the pattern electrodes in the pattern electrodes has a first width along the first direction and has a second width along the second direction, and the second width is greater than the first width.

Advantages

As described above, advantages of the embodiment of the present invention are as follows:

An embodiment of the present invention provides a touch display panel and a touch display device. The touch display panel includes an underlay substrate and touch electrodes. The touch electrode include a plurality of pattern electrodes, and the pattern electrodes are disposed in an array along a first direction and a second direction intersecting the first direction. Adjacent ones of the pattern electrodes are arranged in a staggered arrangement along the first direction, each of the pattern electrodes in the pattern electrodes has a first width along the first direction and has a second width along the second direction, and the second width corresponding to the pattern electrode along the second direction is greater than the first width corresponding to the pattern electrode along the first direction. In the embodiment of the present embodiment, the first width and the second width of the pattern electrodes are changed to further reduce a number of the touch lead lines in the display panel electrically connected to the pattern electrodes to effectively improve a touch precision and a touch effect of the touch display panel, lower a manufacturing cost, and improve of a comprehensive performance of the touch display panel.

DETAILED DESCRIPTION OF PREFERRED EMBODIMENTS

The embodiments as follows refer to the accompanying drawings for illustrating specific embodiments of the present invention that can be embodied.

With constant development of manufacturing technologies for display panels, people have higher demands for various performances and touch effect of a touch display panel. It is expected that a manufactured touch display panel has higher touch sensitivity and touch precision, and better comprehensive performance.

Figure 1:
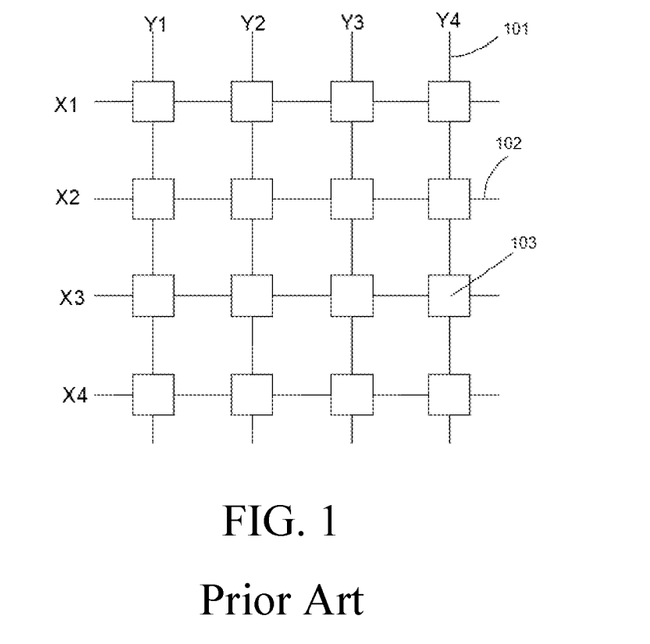
FIG. 1 is a schematic structural view of a conventional self-capacitive touch display panel.

With reference to FIG. 1, FIG. 1 is a schematic structural view of a conventional self-capacitive touch display panel. When disposed, generally a plurality of touch electrodes 103 are disposed in an array on an underlay substrate. Also, each of the touch electrodes 103 has signal lead lines 101 and signal lead lines 102 disposed along a row direction and a column direction respectively. for example, signal lead lines X1, X2, X3, and X4 are disposed along the row direction, and signal lead lines Y1, Y2, Y3, and Y4 are disposed along the column direction. When a touch is performed to the display panel, corresponding ones of the touch electrodes 103 sense a touch point and generate coordinate (Xn, Yn) of the touch point. The conventional touch display panel has a certain error or a great signal-noise ratio when reading coordinate values of touch points. Also, a number of the touch electrodes 103 disposed in the display panel is large, and therefore a number of corresponding lead lines is also large and driver chips connected to the lead lines are many to result in a higher manufacturing cost. Also, undesirable issues such as a lowered touch precision and a touch effect of the display panel also occur.

The embodiment of the present invention provides a touch display panel and a touch display device to effectively improve a touch precision and a touch effect of the touch display panel and raise a comprehensive performance of the touch display device.

Figure 2:
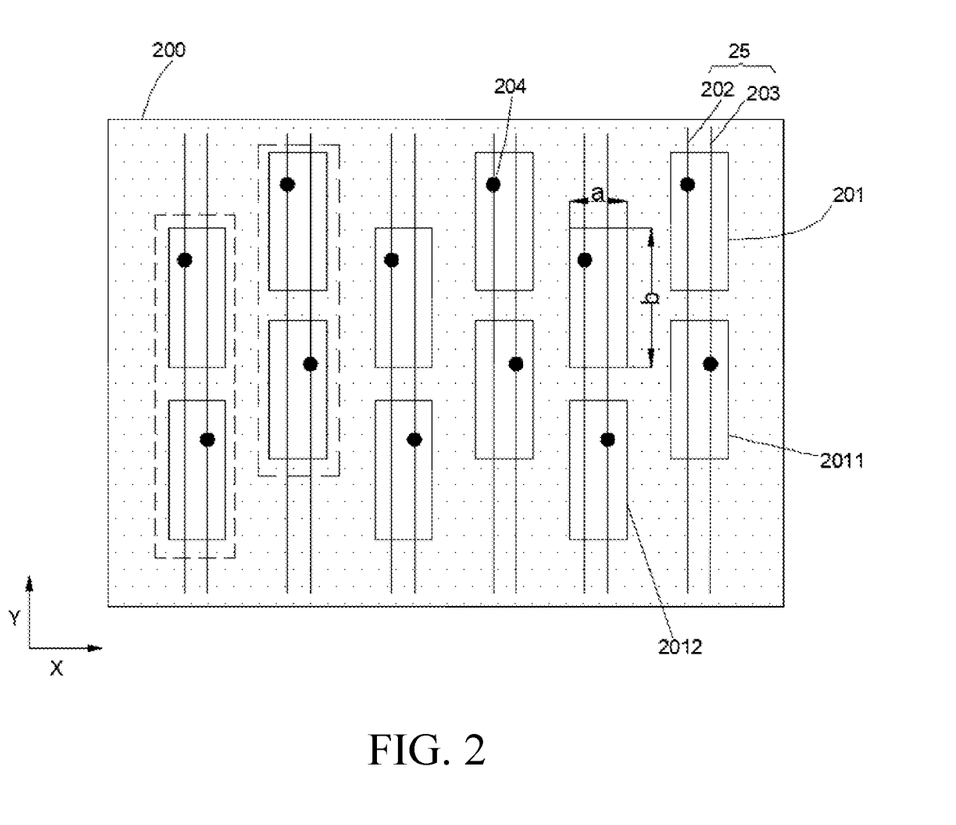
FIG. 2 is a schematic structural plan view of an arrangement of touch electrodes of a touch display panel of an embodiment of the present invention.

With reference to FIG. 2, FIG. 2 is a schematic structural plan view of an arrangement of touch electrodes of a touch display panel of an embodiment of the present invention. In the embodiment of the present invention, the touch display panel includes an underlay substrate 200 and touch electrodes. In particular, the touch electrodes are disposed on the underlay substrate 200, and the touch electrodes includes a plurality of the touch pattern electrodes 201. The pattern electrodes 201 are disposed in an array on the underlay substrate 200.

Preferably, on the underlay substrate 200, the pattern electrodes 201 are arranged along a first direction and a second direction of the underlay substrate 200. In the embodiment of the present embodiment, the first direction intersects the second direction, and an included angle is defined between the first direction and the second direction. In particular, in the following embodiment, the first direction, for example, is a direction corresponding to a row of the underlay substrate 200, namely, the first direction is a horizontal X axis direction, the second direction, for example, is a direction corresponding to a column of the underlay substrate 200. Namely, the second direction is a vertical Y axis direction. At this time, an included angle between the first direction X and the second direction Y is a right angle. Also, other direction can be examples, and therefore an included angle between the first direction X and the second direction Y becomes other values, which is not repeatedly described here.

In the embodiment of the present embodiment, the above pattern electrodes 201 are arranged on the underlay substrate 200. Along a direction of a row corresponding to the first direction X: in the same row, the pattern electrodes 201 are arranged in a staggered arrangement. In particular, for example, in a certain row, adjacent two of the pattern electrodes are a pattern electrode 2011 and a pattern electrode 2012. The pattern electrode 2011 and the pattern electrode 2012 are arranged in a staggered arrangement, namely, a top of the pattern electrode 2011 is not flush with a top of the adjacent pattern electrode 2012.

Also, when each of the pattern electrodes 201 is arranged, a value of the second width corresponding to the pattern electrodes 201 along the second direction Y is greater than a value of the first width corresponding to the pattern electrode 201 along the first direction X. In the present application embodiment, because the value of the second width of each of the pattern electrode 201 along the second direction Y is greater than the value of the first width thereof along the first direction X, a touch area corresponding to the pattern electrode 201 increases accordingly. When the pattern electrodes with the greater touch area are disposed on the array substrate, a number of the pattern electrodes decreases, corresponding touch lead lines disposed on the array substrate and electrically connected to each of the pattern electrodes also decrease accordingly. When a touch operation is performed, an interference between a plurality of touch lead lines easily affecting reading of touch points is effectively reduced.

Furthermore, in the present application embodiment, along the first direction, each of the pattern electrodes has the first width. Along the second direction, each of the pattern electrodes has the second width. With reference to FIG. 2, the first and second widths correspond to a first width value a of the pattern electrode along the first direction and a second width value b of the pattern electrode along the second direction.

In the embodiment of the present embodiment, a height of the pattern electrode 2011 along a Y axis direction and a length of the pattern electrode 2011 along a X axis direction can be set according to a certain proportion. Namely, the first width and the second width corresponding to each of the pattern electrodes 2011 can be set according to a certain proportion relationship. In the present application embodiment, a ratio of a second width of the pattern electrode along the second direction Y to a first width of the pattern electrode along the first direction X is N:1. N is a positive integer, Preferably, N is greater than or equal to 2, for example, N=2, 3, 4 When N=2, the second width of the pattern electrode along the second direction Y is twice of the first width of the pattern electrode along the first direction X. At this time, not only a touch area corresponding to the pattern electrode 2011 can be increased to reduce a number of the arranged pattern electrodes, but also a number of touch lead lines corresponding to the pattern electrodes can be controlled better to guarantee the touch precision and touch effect during touch.

In the following embodiment, a ratio of the second width corresponding to the pattern electrode 201 along the second direction Y to the first width corresponding to the pattern electrode 201 along the first direction X being 2:1 is used as an example for explanation.

Figure 3:
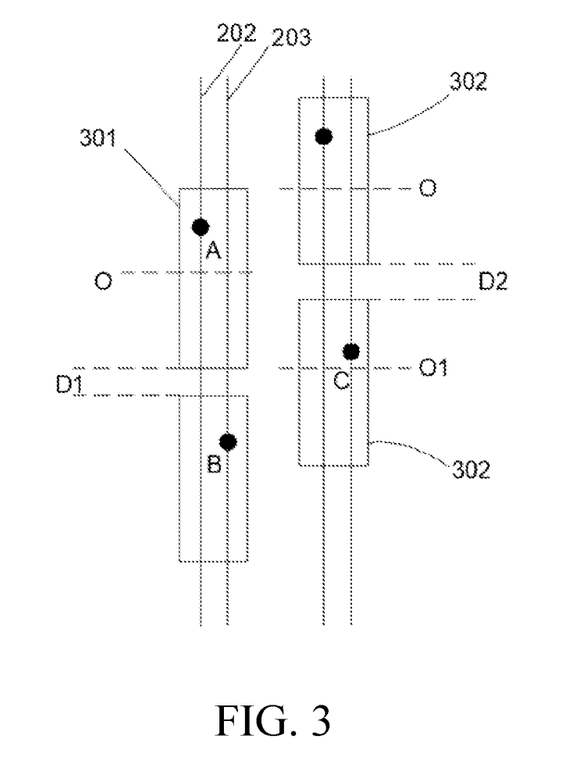
FIG. 3 is a schematic view of another arrangement of pattern electrodes provided by the embodiment of the present invention.

In the embodiment of the present embodiment, with reference to FIG. 3, FIG. 3 is a schematic view of another arrangement of pattern electrodes provided by the embodiment of the present invention. In the present embodiment, the pattern electrodes arranged in two rows and two columns are used as an example. An example of multiple rows and multiple columns is arranged in an array according to an arrangement in FIG. 3.

In particular, in the embodiment of the present embodiment, first pattern electrodes 301 and second pattern electrodes 302 along the first direction X are arranged alternately, and the first pattern electrodes 301 and the second pattern electrodes 302 are located in adjacent two columns respectively. The first pattern electrodes 301 and the second pattern electrodes 302 are arranged in an array to finally form the touch electrodes provided by the embodiment of the present application.

When the above first pattern electrodes 301 and second pattern electrodes 302 are disposed, at least an end portion of the first pattern electrode 301 is flush with a central line O1 of the second pattern electrode 302. The end portion can be a top portion or a bottom portion of the first pattern electrodes 301.

In the embodiment of the present application, when the first pattern electrodes 301 and the second pattern electrodes 302 are disposed, along the second direction Y, an interval between adjacent two of the first pattern electrodes in the first pattern electrodes 301 is the same as an interval between adjacent two of the second pattern electrodes in the second pattern electrodes 302. At this time, an interval between any adjacent two of the first pattern electrodes is the same as an interval between any adjacent two of the second pattern electrodes. When a touch is performed by a finger, a difference value between equivalent capacitors formed between the finger and different pattern electrodes can be effectively reduced to more precisely determine the touch point position thereof and to guarantee a touch precision.

In particular, along the first column direction X, along the second direction Y, an interval distance between adjacent two of the first pattern electrodes 301 is D1. Along the second column direction, an interval distance between adjacent two of the second pattern electrodes 302 is D2. When the embodiment of the present invention is disposed, the corresponding interval distance D1 can be set to be the same as the interval distance D2, namely, D1=D2.

Also, along the first direction X, when the pattern electrodes are arranged in an array, a horizontal interval distance between adjacent two of the first pattern electrodes 301 and the second pattern electrodes 302 can be the same such that controlling the intervals between different electrodes effectively improve its touch precision.

In particular, the second width corresponding to the first pattern electrode 301 along the second direction Y is greater than the first width of the first pattern electrodes 301 along the first direction X. The second width of the second pattern electrodes 302 along the second direction Y is greater than the first width of the second pattern electrodes 302 along the first direction X.

Furthermore, in the embodiment of the present embodiment, when each of the pattern electrodes is disposed, a shape of each of the pattern electrodes can be the same. For example, the shape of the pattern electrodes is disposed as a shape structure such as rectangle, square, circle, etc. In the embodiment of the present embodiment, a rectangle is used as an example for explanation. Also, an area of each of the pattern electrodes is guaranteed to be the same.

Figure 4:
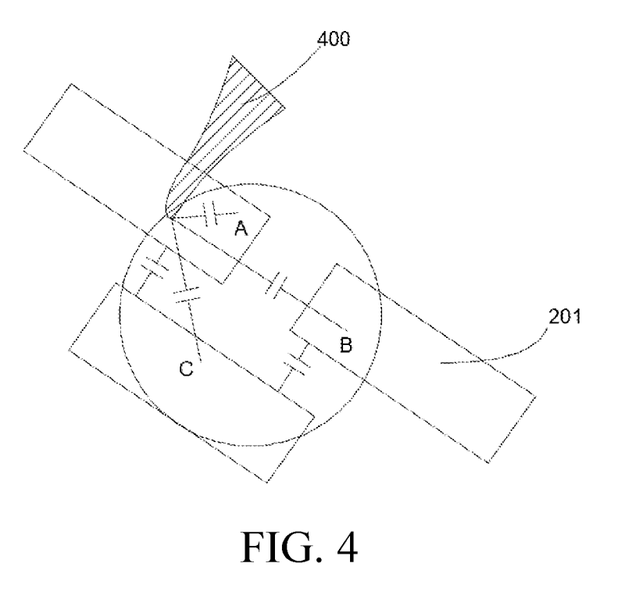
FIG. 4 is a schematic view of a touch operation corresponding to a touch display panel provided by the embodiment of the present invention.
Figure 5:
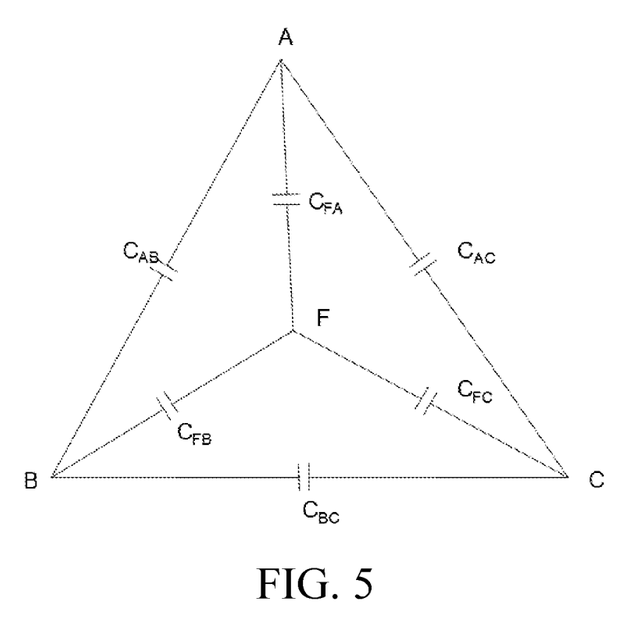
FIG. 5 is a schematic structural view of an equivalent circuit formed by touch pattern electrodes.

When a shape and a size of each of the pattern electrodes is the same, a resistance corresponding to each of the pattern electrodes is also the same. When a touch operation is performed to the touch display panel, with reference to FIGS. 4 and 5, FIG. 4 is a schematic view of a touch operation corresponding to a touch display panel provided by the embodiment of the present invention. FIG. 5 is a schematic structural view of an equivalent circuit formed by the corresponding touch pattern electrodes in FIG. 4. touch electrode arrangement structure in FIGS. 1 to 3 are also combined.

With particular reference to FIG. 4, when a touch object 400 performs a touch operation to the touch electrodes, for example, the touch object 400 is a finger, the finger touches different touch pattern electrodes 201 to form a capacitor on corresponding ones of the touch pattern electrodes 201. A recognition unit determines the touch operation according to a size of a formed capacitor and a corresponding touch point and precisely reports a touch region.

With particular reference to FIG. 5, when the finger performs a touch, equivalents on the touch pattern electrodes are touch points A, B and C, and F is an equivalent touch point of the finger. At this time, different equivalent capacitors are formed between finger and each electrode and formed between the electrodes. For example, equivalent capacitors CAB, CAC, CBC are formed equivalently among adjacent two of the pattern electrodes. An equivalent capacitor is formed between the touch point F equivalent to the finger and each of the pattern electrodes, for example, CFA, CFB and CFC.

In the embodiment of the present embodiment, because the touch point B and the touch point C are equivalents formed by the pattern electrodes in the same column, when an interval between the touch point B and the touch point C is different from an interval between the touch point A and the touch point B, $CAB=CAC \neq CBC$. When each capacitor value is read, when CFB>CFC, a value read from B is greater than a value read from C. According to a calculation, a corresponding touch point is located on an upper half portion of A such that a touch point of the touch display panel is obtained precisely.

Preferably, when the touch finger performs a touch to the touch pattern electrodes, an equivalent capacitor is formed between the touch finger and each of the pattern electrodes, namely, CFA, CFB and CFC. A value of each equivalent capacitor is according to a relative distance. When a distance between the touch finger and each of the pattern electrodes is the same, the above equivalent capacitor value is the same.

Furthermore, the embodiment of the present invention measures an equivalent capacitor between the touch point F equivalent to the finger and each electrode and an equivalent capacitor between the electrodes and compare the equivalent capacitors between the touch finger and each of the touch pattern electrodes to precisely obtain a position of the touch point, which effectively improves a touch precision and a touch effect of the touch display panel.

Preferably, with reference to FIGS. 1 and 2, in the embodiment of the present embodiment, the touch display panel further includes a plurality of touch lead lines 25. In particular, the touch lead lines 25 are electrically connected correspondingly to the pattern electrodes 201. In the embodiment of the present embodiment, a first touch lead line 202 and a second touch lead lines 203 are used as an example for explanation. The first touch lead line 202 and the second touch lead lines 203 are disposed along the second direction Y, and are electrically connected correspondingly to two of the pattern electrodes 201 along the second direction.

Figure 6:
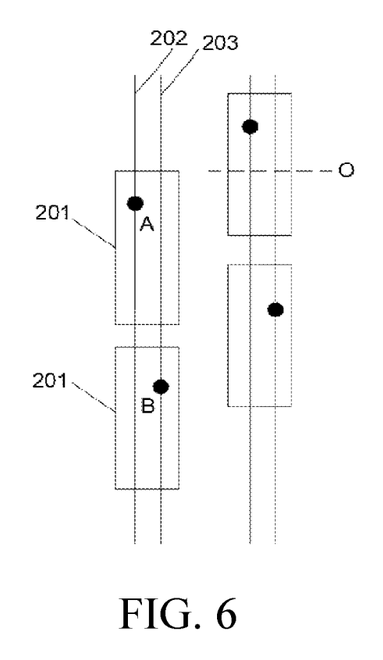
FIG. 6 is a schematic structural view of connection terminals provided by the embodiment of the present invention.

In particular, each of the pattern electrodes 201 further includes connection terminals 204. The connection terminals 204 are electrically connected to corresponding ones of the touch lead lines 25. Various data signals are transmitted to the touch lead lines 25 through the connection terminals 204. In the embodiment of the present embodiment, with reference to FIG. 6, FIG. 6 is a schematic structural view of connection terminals provided by the embodiment of the present invention. When each of the connection terminals is disposed, for example, a connection terminal A and a connection terminal B, at this time, an end of the connection terminal A is electrically connected to the pattern electrode, and another end of the connection terminal A is electrically connected to the first touch lead line 20. An end of the connection terminal B is electrically connected to the pattern electrode, and another end of the connection terminal B is electrically connected to the second touch lead lines 203.

In the embodiment of the present embodiment, along the same column direction, a plurality of touch lead lines 25 can be disposed. The touch lead lines 25 are disposed at equal intervals, and in different columns, intervals among the touch lead lines 25 are the same.

Also, a distance between the connection terminal A and an end of the pattern electrode is the same as a distance between the connection terminal B and an end of the pattern electrode. Namely, a distance between the connection terminal A and a top portion of the pattern electrode 201 is the same as a distance between the connection terminal B and the top portion of the pattern electrode 201. As such, along the first direction, each of the connection terminals disposed on two pattern electrodes 201 at an interval is located a same straight line to guarantee a better uniformity of the connection terminals disposed in different columns to reduce influence to the touch precision during a touch.

Furthermore, in the embodiment of the present application, when the above each of the connection terminal A, the connection terminal B and connection terminal C are disposed, a connection line distance between two of the connection terminal A, the connection terminal B, and the connection terminal C is the same to guarantee a higher touch effect.

In the embodiment of the present embodiment, because the second width of the pattern electrode 201 along the second direction is greater than the first width of the pattern electrode 201 along the first direction, for the underlay substrate has a constant size, along the second direction, a number of disposed touch electrodes is reduced. Also, a number of total touch lead lines disposed on the underlay substrate is decreased accordingly, which effectively reduces a manufacturing cost of the touch display panel.

Figure 7:
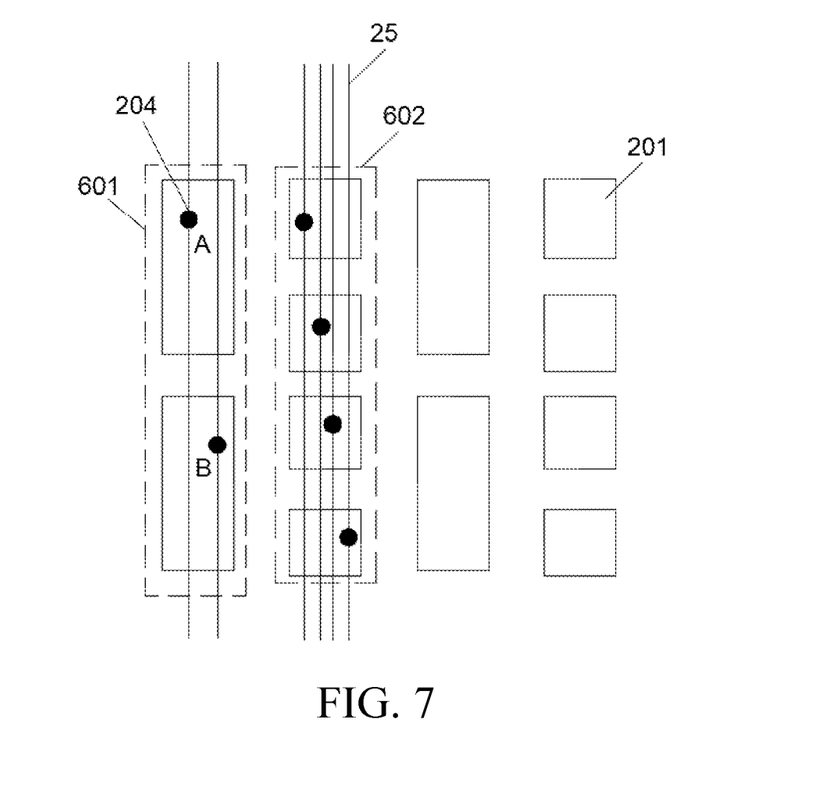
FIG. 7 is a schematic view of an arrangement of touch electrodes of another touch display panel provided by the embodiment of the present invention.

With reference to FIG. 7, FIG. 7 is a schematic view of an arrangement of touch electrodes of another touch display panel provided by the embodiment of the present invention. With reference to the arrangement structure in FIG. 1, in the embodiment of the present invention, the touch electrodes include a plurality of pattern electrodes 201. The pattern electrodes 201 are arranged in an array along the first direction and the second direction.

The pattern electrodes 201 further includes a plurality of third pattern electrodes 601 and a plurality of fourth pattern electrodes 602. The third pattern electrodes 601 and the fourth pattern electrodes 602 are disposed adjacent to each other, and a plurality of sub-pattern electrodes can be disposed in the third pattern electrodes 601 and the fourth pattern electrodes 602. The sub-pattern electrodes are disposed in an array at intervals along a corresponding column direction.

In the embodiment of the present embodiment, when the third pattern electrodes 601 are disposed, a second width corresponding to the third pattern electrode along the second direction is greater than a first width of the third pattern electrode along the first direction, and a second width of the third pattern electrode along the second direction is greater than a second width of the fourth pattern electrode along the second direction. At this time, a length of the third pattern electrode 601 is greater than a length of the fourth pattern electrode. Such arrangement, along a certain column direction, increases an area of the corresponding pattern electrode to improve its touch precision.

Preferably, along the second direction, a ratio of the second width of the third pattern electrode along the second direction to the first width of the third pattern electrode along the first direction is 2:1. Furthermore, in the embodiment of the present embodiment, the width of the third pattern electrode along the first direction is the same as the width of the fourth pattern electrode along the first direction. Also, the width of the fourth pattern electrode along the first direction is the same as the length of the third pattern electrode along the second direction, namely, the fourth pattern electrode can be disposed as a square structure. Alternatively, when the third pattern electrode and fourth pattern electrode are disposed, the first width of the third pattern electrode is set to be greater than the first width of the fourth pattern electrode to further change a corresponding resistance value to achieve an objective of improving a touch precision.

Furthermore, when the sub-pattern electrodes are disposed in each of the third pattern electrodes 601 and the fourth pattern electrodes 602, an interval distance between adjacent two of the sub-pattern electrodes can be the same, and the distance is less than an interval between adjacent two of the sub-pattern electrodes in the third pattern electrodes.

Also, the touch lead lines 25 and the connection terminals 204 are also disposed correspondingly on the third pattern electrodes 601 and the fourth pattern electrodes 602. The connection terminals 204 can be disposed on surfaces of corresponding ones of the pattern electrodes or side surfaces of the corresponding ones of the pattern electrodes, which is specifically determined according to a shape and a structure of the electrode. In particular, in the third pattern electrodes 601, an electrode area thereof is greater than an electrode plate corresponding to the fourth pattern electrodes. Therefore, during disposing, in adjacent two of the columns, a number of the sub-pattern electrodes disposed in the third pattern electrodes 601 is less than a number of the sub-pattern electrodes disposed in the fourth pattern electrodes 602. Thus, a number of the touch lead lines 25 in a region corresponding to the third pattern electrodes 601 is less than a number of the touch lead lines 25 corresponding to the fourth pattern electrodes 602. Arranging the pattern electrodes in a staggered arrangement and controlling corresponding first width and second width effectively improves the touch precision and touch effect of the display panel.

With reference to FIG. 7, in the region, two the touch lead lines 25 are electrically connected to two third pattern electrodes, four the touch lead lines 25 are electrically connected to four fourth pattern electrodes. Therefore, a number of the pattern electrodes 201 is reduced, and a number of the touch lead lines in the touch display panel are reduced to, which effectively a manufacturing cost of the display panel.

Furthermore, when the connection terminals 204 corresponding to the third pattern electrodes 601 are disposed, a distance between each of the connection terminals and a side of the pattern electrode distance can be set as the same. When the connection terminals 204 corresponding to the fourth pattern electrodes 602 are disposed, a distance between each of the connection terminals and a side of the pattern electrode can also be set as the same to guarantee a better uniformity of the connection terminals on the touch electrodes.

Also, the embodiment of the present invention also provides a touch display device, the touch display device includes a display panel and a touch display panel. The display panel is disposed opposite to the touch display panel. For example, the touch display panel is bonded to the display panel. The touch display panel includes a touch region. A plurality of touch electrodes are disposed in the touch region. A touch is performed to the touch electrodes in the touch region to implement a touch operation. In particular, the touch display panel is a touch display panel provided by the embodiment of the present application. When a touch operation is performed to the touch display device, a higher touch precision and a better touch effect is achieved. The touch electrodes in the touch display panel provided by the embodiment of the present invention are disposed according to the above electrode structure to effectively improve a touch performance of the touch display panel and effectively lower a manufacturing cost of the touch device.

Furthermore, the touch display panel and touch display device can be: any product or part with touch display function such as organic light emitting diode (OLED) display panel, cell phone, computer, electronic paper, monitor, laptop, digital photo frame, and a specific type thereof is has no limit.

The touch display panel and the touch display device provide by the embodiment of the present invention are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not make the essence of the technical solutions depart from a range of the technical solutions of the embodiments of the present application.

What is claimed is:

1. A touch display panel, comprising:
an underlay substrate; and
touch electrodes comprising a plurality of pattern electrodes, wherein the pattern electrodes are disposed in an array along a first direction and a second direction intersecting the first direction;
wherein adjacent ones of the pattern electrodes are arranged in a staggered arrangement along the first direction, each of the pattern electrodes in the pattern electrodes has a first width along the first direction and has a second width along the second direction, the second width is greater than the first width, an included angle is defined between the first direction and the second direction, and the included angle is a right angle;
wherein the pattern electrodes comprise a plurality of first additional pattern electrodes and a plurality of second additional pattern electrodes, the first additional pattern electrodes and the second additional pattern electrodes are arranged in an array along the first direction and the second direction, and the first additional pattern electrodes and the second additional pattern electrodes along the first direction are disposed alternately;
wherein each of the first additional pattern electrodes has a plurality of sub-pattern electrodes arranged continuously along the second direction at intervals, each of the second addition pattern electrodes has a plurality of sub-pattern electrodes arranged continuously along the second direction at intervals, and a number of the sub-pattern electrodes in the first additional pattern electrode is less than a number of the sub-pattern electrodes in the second additional pattern electrode.

2. The touch display panel according to claim 1, wherein a ratio of the second width of the pattern electrode along the second direction to the first width of the pattern electrode along the first direction is N:1, and the N is an integer greater than 1.

3. The touch display panel according to claim 2, wherein the second width of the pattern electrodes along the second direction is twice the first width of the pattern electrodes along the first direction.

4. The touch display panel according to claim 1, wherein the pattern electrodes comprise a plurality of first pattern electrodes and a plurality of second pattern electrodes, the first pattern electrodes and the second pattern electrodes are disposed alternately along the first direction, wherein along the first direction, at least an end portion of one of the first pattern electrodes is flush with a central line of one of corresponding ones of the second pattern electrodes.

5. The touch display panel according to claim 4, wherein along the first direction, the first pattern electrodes and the second pattern electrodes are disposed alternately at equal intervals.

6. A touch display panel, comprising:
an underlay substrate; and
touch electrodes comprising a plurality of pattern electrodes, wherein the pattern electrodes are disposed in an array along a first direction and a second direction intersecting the first direction;
wherein adjacent ones of the pattern electrodes are arranged in a staggered arrangement along the first direction, each of the pattern electrodes in the pattern electrodes has a first width along the first direction and has a second width along the second direction, and the second width is greater than the first width;
wherein the pattern electrodes comprise a plurality of first additional pattern electrodes and a plurality of second additional pattern electrodes, the first additional pattern electrodes and the second additional pattern electrodes are arranged in an array along the first direction and the second direction, and the first additional pattern electrodes and the second additional pattern electrodes along the first direction are disposed alternately;
wherein each of the first additional pattern electrodes has a plurality of sub-pattern electrodes arranged continuously along the second direction at intervals, each of the second addition pattern electrodes has a plurality of sub-pattern electrodes arranged continuously along the second direction at intervals, and a number of the sub-pattern electrodes in the first additional pattern electrode is less than a number of the sub-pattern electrodes in the second additional pattern electrode.

7. The touch display panel according to claim 6, wherein a ratio of the second width of the pattern electrode along the second direction to the first width of the pattern electrode along the first direction is N:1, and the N is an integer greater than 1.

8. The touch display panel according to claim 7, wherein the second width of the pattern electrodes along the second direction is twice the first width of the pattern electrodes along the first direction.

9. The touch display panel according to claim 6, wherein the pattern electrodes comprise a plurality of first pattern electrodes and a plurality of second pattern electrodes, the first pattern electrodes and the second pattern electrodes are disposed alternately along the first direction, wherein along the first direction, at least an end portion of one of the first pattern electrodes is flush with a central line of one of corresponding ones of the second pattern electrodes.

10. The touch display panel according to claim 9, wherein along the first direction, the first pattern electrodes and the second pattern electrodes are disposed alternately at equal intervals.

11. The touch display panel according to claim 10, wherein along the second direction, an interval between adjacent two of the first pattern electrodes is the same as an interval between adjacent two of the second pattern electrodes.

12. The touch display panel according to claim 9, wherein the first width of each of the first pattern electrodes along the first direction is the same as the first width of each of the second pattern electrodes along the first direction.

13. The touch display panel according to claim 9, wherein a second width of the first pattern electrode along the second direction is greater than a first width of the first pattern electrode along the first direction, and a second width of the second pattern electrode along the second direction is greater than a first width of the second pattern electrode along the first direction.

14. The touch display panel according to claim 6, wherein the touch display panel further comprises touch lead lines, and the touch lead lines are connected correspondingly to the pattern electrodes.

15. The touch display panel according to claim 14, wherein the touch display panel further comprises connection terminals, the connection terminals are disposed on the pattern electrodes, the touch lead lines are electrically connected to the pattern electrodes through the connection terminals.

16. The touch display panel according to claim 15, wherein along the first direction, the connection terminals disposed on the pattern electrodes at intervals are located in a same straight line.

17. The touch display panel according to claim 8, wherein intervals among adjacent ones of the touch lead lines are the same.

18. The touch display panel according to claim 6, wherein the second width of each of the first additional pattern electrodes along the second direction is greater than the second width of each of the second additional pattern electrodes along the second direction.

19. The touch display panel according to claim 18, wherein a length of the first additional pattern electrodes along the second direction is greater than a length of the second additional pattern electrodes along the second direction.

20. A touch display device, comprising:
a display panel; and,
a touch display panel, wherein the touch display panel is disposed opposite to the display panel, the touch display panel comprises a touch region, and a plurality of touch electrodes are disposed in the touch region;

wherein the touch display panel comprises:

an underlay substrate; and touch electrodes comprising a plurality of pattern electrodes, wherein the pattern electrodes are disposed in an array along a first direction and a second direction intersecting the first direction;

wherein adjacent ones of the pattern electrodes are arranged in a staggered arrangement along the first direction, each of the pattern electrodes in the pattern electrodes has a first width along the first direction and has a second width along the second direction, and the second width is greater than the first width;

wherein the pattern electrodes comprise a plurality of first additional pattern electrodes and a plurality of second additional pattern electrodes, the first additional pattern electrodes and the second additional pattern electrodes are arranged in an array along the first direction and the second direction, and the first additional pattern electrodes and the second additional pattern electrodes along the first direction are disposed alternately;

wherein each of the first additional pattern electrodes has a plurality of sub-pattern electrodes arranged continuously along the second direction at intervals, each of the second addition pattern electrodes has a plurality of sub-pattern electrodes arranged continuously along the second direction at intervals, and a number of the sub-pattern electrodes in the first additional pattern electrode is less than a number of the sub-pattern electrodes in the second additional pattern electrode.

\* \* \* \* \*